US012759853B2

(12) United States Patent
Perstling et al.

(10) Patent No.: US 12,759,853 B2
(45) Date of Patent: Oct. 13, 2026

(54) MAST FOR A STACKER CRANE

(71) Applicant: Vectron Logistics GmbH, Vorchdorf (AT)

(72) Inventors: Manuel Perstling, Steinhaus bei Wels (AT); Florian Brunmayr, Wels (AT); Herbert Aschauer, Wels (AT); Thomas Wakolbinger, Stadl-Paura (AT)

(73) Assignee: Vectron Logistics GmbH, Vorchdorf (AT)

( * ) Notice: Subject to any disclaimer, the term of this patent is extended or adjusted under 35 U.S.C. 154(b) by 292 days.

(21) Appl. No.: 18/728,743

(22) PCT Filed: Jan. 3, 2023

(86) PCT No.: PCT/AT2023/060001
§ 371 (c)(1),
(2) Date: Jul. 12, 2024

(87) PCT Pub. No.: WO2023/133603
PCT Pub. Date: Jul. 20, 2023

(65) Prior Publication Data

US 2025/0059013 A1 Feb. 20, 2025

(30) Foreign Application Priority Data

Jan. 15, 2022 (AT) .............................. A 50014/2022

(51) Int. Cl.
*B66F 9/08* (2006.01)
*B66F 9/07* (2006.01)

(52) U.S. Cl.
CPC ................ *B66F 9/087* (2013.01); *B66F 9/07* (2013.01)

(58) Field of Classification Search
CPC ............... B66F 9/07; B66F 9/087; B66F 9/08
USPC .................................................. 414/696, 630
See application file for complete search history.

(56) References Cited

U.S. PATENT DOCUMENTS

2010/0068022 A1* 3/2010 Aschauer .................. B66F 9/07
414/630
2022/0402737 A1* 12/2022 Sai ....................... B65G 1/0407

FOREIGN PATENT DOCUMENTS

DE 196 31 511 4/1997
DE 10 2016 124 447 6/2018
EP 3 088 347 8/2009
JP 2008-74541 6/2008
(Continued)

OTHER PUBLICATIONS

Int'l Search Report (Form PCT/ISA/210) conducted in Int'l Appln. No. PCT/AT2023/060001 (Apr. 13, 2023).
(Continued)

*Primary Examiner* — Glenn F Myers
(74) *Attorney, Agent, or Firm* — GREENBLUM & BERNSTEIN, P.L.C.

(57) ABSTRACT

A mast for a storage and retrieval machine having several, preferably four support elements or supports, to which connecting plates are fastened in order to form a mast profile. Connecting plates are fastened in alternating fashion to the inside and outside of the support elements or supports on two opposite side panels of the mast to increase flexural and torsional rigidity, for which purpose the support element comprises corresponding fastening grooves on the inside and outside.

15 Claims, 3 Drawing Sheets

(56) References Cited

FOREIGN PATENT DOCUMENTS

Figure 1:
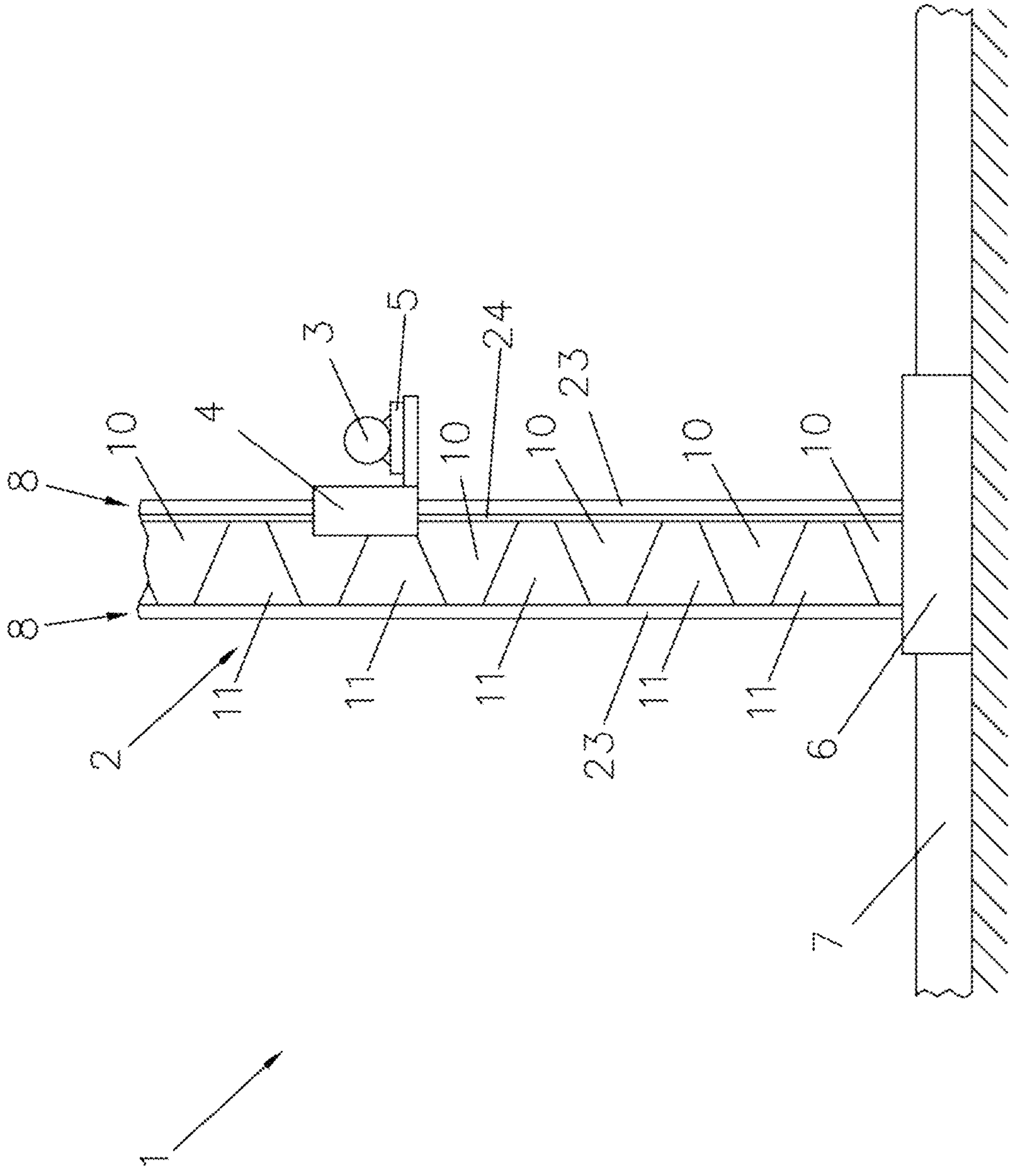

| | | |
|---|---|---|
| JP | 2018-48030 | 3/2018 |
| WO | 2021/100313 | 5/2021 |

OTHER PUBLICATIONS

Int'l Written Opinion (Form PCT/ISA/237) conducted in Int'l Appln. No. PCT/AT2023/060001 (Apr. 13, 2023).

* cited by examiner

MAST FOR A STACKER CRANE

The present invention relates to a mast for a storage and retrieval machine, as described in claim 1.

DE 196 31 511 A1 discloses a mast or lifting mast in lightweight construction for a storage and retrieval machine, in which metal sheets are screwed onto four support elements over the entire surface on the outside. To this end, two different profiles of the support elements are used, whereby the two support elements for the guide rail are formed as double profiles and the two other support elements as single profiles, so that fastening grooves are arranged on each side. This makes it possible to attach the guide rail and the metal sheets to the double profile on the outside, as there are two fastening grooves on the double profile, whereas the single profile comprises only one fastening groove for attaching a metal sheet on the outside.

The disadvantage of this design is that the lightweight design of the mast can be used only for storage and retrieval machines for container storage or lightweight goods, as flexural and torsional rigidity is given only for low payloads. Another disadvantage is the multitude of different metal sheets and profiles that are needed to build the mast.

Furthermore, EP 3088347 A1 discloses a storage and retrieval machine in which the mast is formed from two externally located supports that are connected via cross beams with gusset plates to form a flexurally rigid connection. The disadvantage here is that due to the very massive design of the supports the mast design can no longer be flexible. Furthermore, the mast width is predetermined by the fixed profiles, and an increase in the width of the mast cross-section is possible only with a new, wider profile.

The objective of the present invention is to create a mast for a storage and retrieval machine in which, on the one hand, the above-mentioned disadvantages are eliminated and, on the other hand, the basic structure of the mast is so highly flexible and modular that the diverse demands on storage and retrieval machines posed by lightweight goods and pallets can be covered with the same mast structure in a lightweight design.

The objective is achieved by the present invention. Advantageous measures and embodiments are disclosed in the dependent claims.

The objective is achieved by a mast for a storage and retrieval machine, in which connecting plates are fastened in alternating fashion on the inside and outside of the support elements or supports on two opposite side panels of the mast in order to increase the flexural and torsional rigidity, for which purpose the support element comprises corresponding fastening grooves on the inside and outside.

The advantage here is that the alternating attachment of a connecting plate on the outside and inside of the support elements significantly improves flexural stiffness, so that even goods having a large weight, as is usually the case with pallets, can be transported into or removed from the high rack using such a mast. Another advantage is that the modular design of the mast, using support elements and connecting plates, allows the cross-section of the mast to be designed variably and adapted to the requirements for flexural and torsional rigidity or the moment of inertia without a need for other support elements.

Advantageous embodiments are such in which the other two front panels of the mast have metal sheets attached over the entire surface to the outside and preferably to the inside of the support elements. This ensures that the special design of the support element, in particular the aluminum profile, allows the metal sheets and the connecting plates for the side panel to be attached on the inside, whereby torsional rigidity is significantly increased.

In an advantageous embodiment, the fastening grooves for the side panel and the front panel are arranged at an angle of 90° to each other on the inside of the support element. This makes it possible for the first time to have the metal sheets and connecting plates attached on the inside of the support elements, both on the front and side panel.

In the profiles known from the prior art, the fastening grooves are also arranged at an angle of 90°, but the two fastening grooves are not arranged in relation to each other, so that only one sheet can be mounted, as the other fastening groove is covered by the sheet. In the prior art, it is thus only possible to have a second layer of sheet metal formed on either the front panels or the side panel.

In an advantageous embodiment, one of the two connecting plates for the outside or inside of the side panel is straight and the other folded. This ensures that the connecting plate on the inside is connected to the connecting plate on the outside so that the connecting plate on the outside can be connected, in particular screwed, to the connecting plate on the inside. Preferably, the connecting plates for the outside of the side panel are formed straight, and the connecting plates for the inside of the side panel folded in the area between the support elements.

In an advantageous embodiment, the straight and folded connecting plates are trapezoidal or similar in shape, with the short and long sides attached to the support elements. This ensures that the connecting plates arranged on the inside and outside are screwed together in an angular form, increasing flexural stiffness.

In an advantageous embodiment, the connecting plates are preferably fastened to the support elements and each other with screws. This ensures easy assembly, as the individual parts only need to be screwed together.

In an advantageous embodiment, the guide rails for a vertically movable pallet truck are attached to two support elements positioned next to each other. This ensures that direct attachment to the support elements or the aluminum profile is possible.

Advantageous embodiments are such in which the support element comprises a contact surface for the guide rail, whereby a fastening groove for attachment of the guide rail is arranged in the contact surface. This ensures that stable fixation of the guide rail is possible.

In an advantageous embodiment, the guide rail is fastened by the contact surface of the support element on the one hand and positively clamped by connecting plates on the other hand. This ensures that the guide rail is held securely for heavy loads from the pallet truck.

In an advantageous embodiment, the support element is formed by an aluminum profile. This ensures that the special design of the profile makes it possible for the first time to fit connecting plates and metal sheets on the inside. In addition, this enables the guide rail to be securely fastened and concomitantly a connecting plate mounted on the outside to clamp the guide rail.

Advantageous embodiments are such in which the fastening grooves for the guide rail and the side panel on the outside of the support element are arranged at an angle of 90° to each other. This ensures that on the one hand the guide rail and on the other hand the connecting plate can be fitted.

Advantageous embodiments are such in which the connecting plates for the side panel are attached over the entire surface on the outside and inside. This ensures that creation of a different design of the mast with the support element, in particular the aluminum profile, which also has a high flexural stiffness due to the design of the connecting plates on the outside and inside, is made possible.

Advantageous embodiments are such in which the connecting plates for the outside between the support elements are folded and the connecting plates for the inside straight, or vice versa. This ensures that an inverse design is created.

In an advantageous embodiment, the support elements, in particular the aluminum profiles, are of the same design. This ensures that only a single profile is required.

Ultimately, advantageous embodiments are such in which the connecting plates are designed as full-surface plates. This ensures that two parallel cladding surfaces are formed.

The invention is further explained by means of the exemplary embodiment shown in the drawings, wherein, however, the invention is not limited to this exemplary embodiment.

Figure 3:
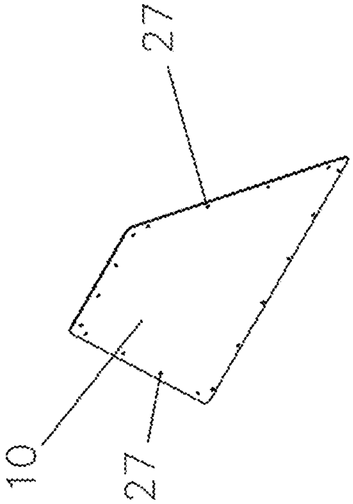
Figure 4:
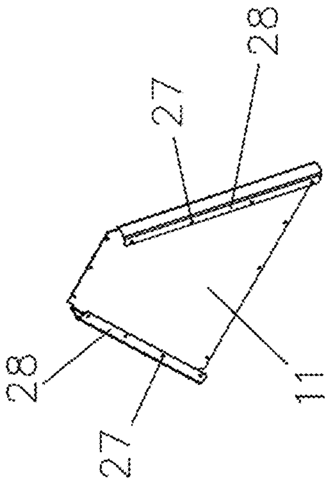
Figure 2:
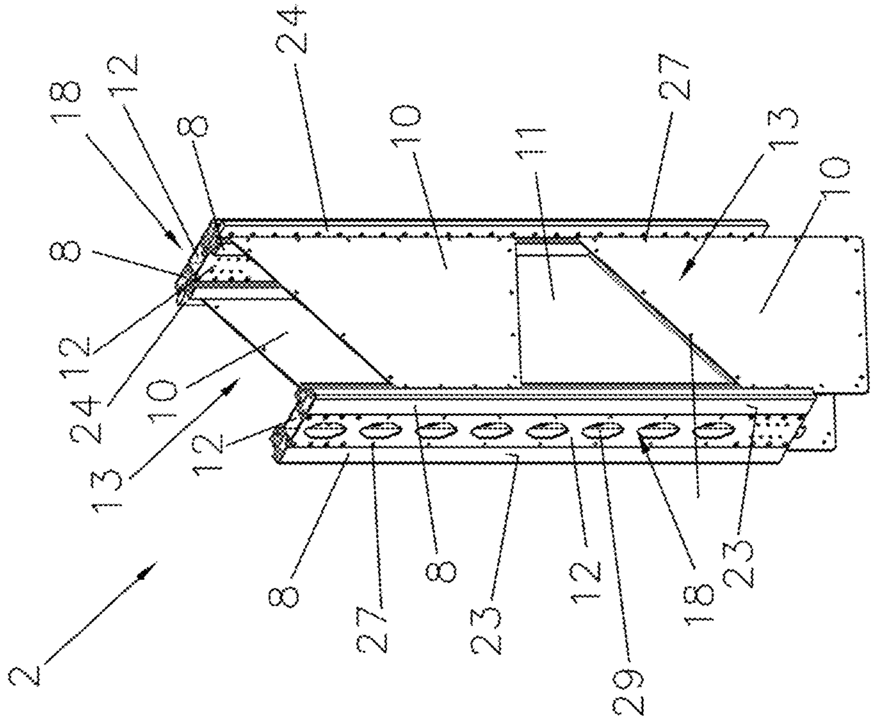
Figure 5:
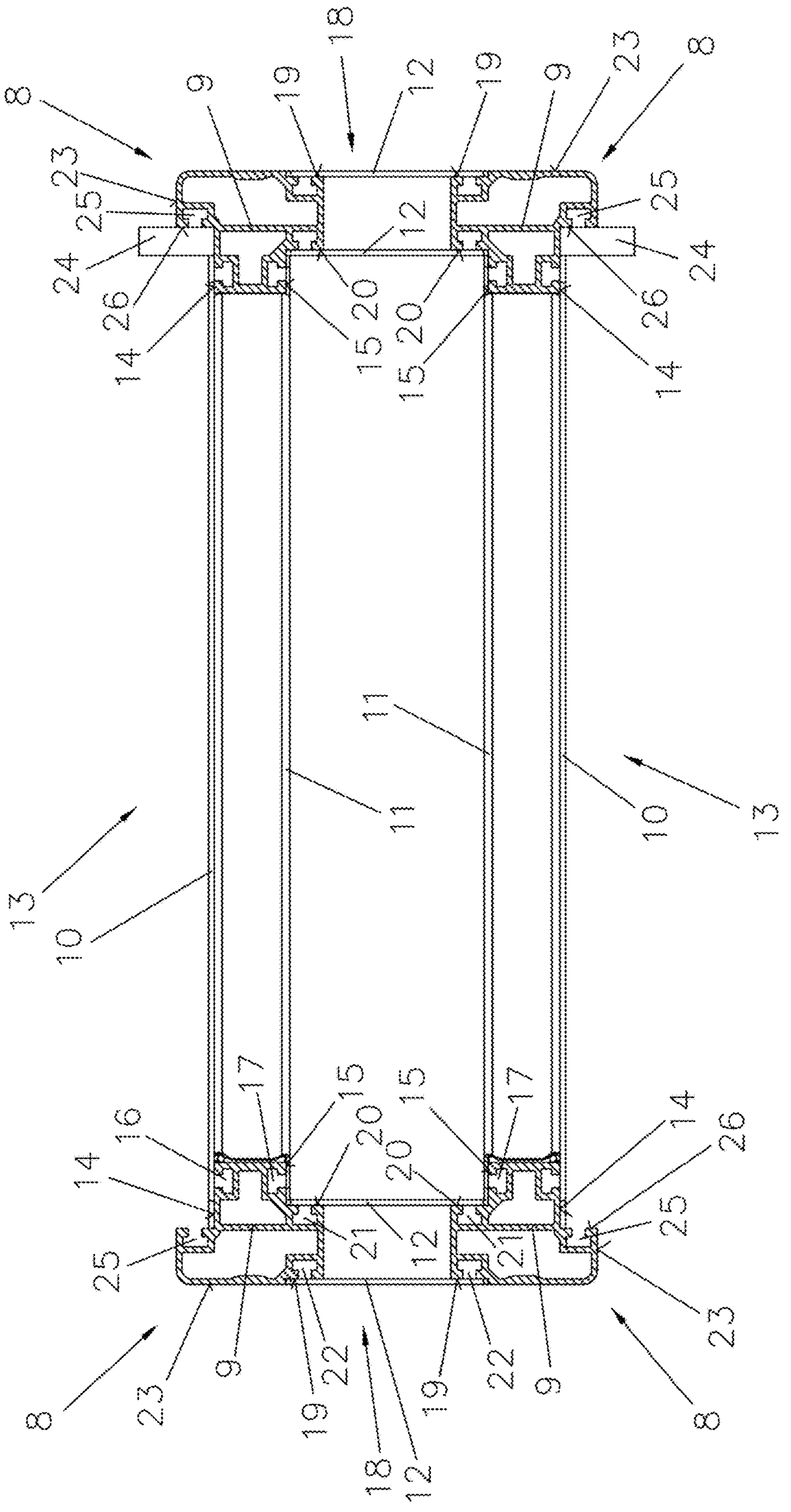

The figures show:

FIG. 1A schematic illustration of a storage and retrieval machine with a mast; simplified, for illustrative purposes only;

FIG. 2 a schematic illustration of a part of the mast with metal sheets and connecting plates mounted on it; simplified, for illustrative purposes only;

FIG. 3 a schematic illustration of the connecting plates to be mounted on the outside of the profiles or support elements; simplified, for illustrative purposes only;

FIG. 4 another schematic illustration of the connecting plates to be mounted on the inside of the profiles or support elements; simplified, for illustrative purposes only;

FIG. 5 a section through the mast; simplified, for illustrative purposes only.

It should be stated by way of introduction that, in the individual embodiments, identical parts are provided with the same reference numbers or same component designations, respectively, wherein the disclosures contained in the entire description can, by analogy, be transferred to identical parts with identical reference numbers or identical component designations, respectively. The position details selected in the description, such as, e.g., top, bottom, lateral, etc., likewise relate to the figure described, and in the event of a change of position, they are to be transferred to the new position by analogy. Individual features or feature combinations from the exemplary embodiments shown and described may also represent independent inventive solutions.

FIGS. 1 to 5 show a storage and retrieval machine 1 with a mast 2 for storing goods 3 in a high-bay warehouse (not shown), preferably using a pallet warehouse, i.e. a pallet truck 4 transports a pallet 5 loaded with goods 3 into or out of the high-bay warehouse.

For this purpose, the pallet truck 4 is moved up or down along the mast 2, whereby the pallet truck 4 is designed to pick up and deposit preferably one pallet 5 in the high-bay warehouse. Furthermore, the storage and retrieval machine 1 comprises a running gear 6 for moving the mast 2 with the pallet truck 4 along a rail 7.

In accordance with the present invention, it is now envisaged that the mast 2 is constructed as a lightweight structure, whereby several, in particular four, identical supports or support elements 8, which are formed from an extruded aluminum profile 9 developed in-house, are used for this purpose, which are connected with connecting plates 10, 11 and metal sheets 12.

To this end, in order to increase flexural stiffness connecting plates 11, 12 are fastened in alternating fashion on the outside 14 and inside 15 of the support elements 8 or supports on two opposite side panels 13 of the mast 2, for which purpose the support element 8, in particular the aluminum profile 9, comprises corresponding fastening grooves 16, 17 on the inside 15 and outside 14, i.e. an externally mounted connecting plate 11 is followed by an internally mounted connecting plate 12, whereupon in turn an externally and internally mounted connecting plate 11, 12 is attached in alternating fashion, until the mast 2 is completely closed, as shown in FIG. 2. Furthermore, on the further two front panels 18 of the mast 2, metal sheets 12 are attached over the entire surface on the outside 19 and preferably on the inside 20 of the support elements 8, i.e. one metal sheet 12 adjoins the next metal sheet 12 both on the outside and on the inside. To enable the plates 12 for the front panels 18 to be mounted on the inside 20, it is necessary that a fastening groove 21 for the plates 12 is arranged rotated by 90° to the fastening grooves 17 for the side panel 13 on the support element 8, i.e. the two fastening grooves 17, 21 for the front panel 18 and the side panel 13 are aligned with each other and form an angle of 90°, so the connecting plates 11 for the side panel 13 and the plates 12 for the front panel 18 can be fastened, in particular screwed on, on the inside 15, 20 from one side using fastening means, in particular screws. Here, the sheets 12 and connecting sheets 11 are fastened from the same side but rotated by 90°, which is possible for the first time due to the special design of the support element 8, in particular the aluminum profile 9 developed in-house.

Furthermore, the support element 8 also comprises a fastening groove 22 on the outside 19 for the metal sheet 12 of the front panel 18. Here, for the outside 19 a visible surface 23 running at an angle of 90° is formed, which the fastening grooves 16, 22 for the side panel 13 and front panel 18 join. To enable a guide rail 24 for the pallet truck 4 to be mounted as well, a further fastening groove 25 is formed at an angle of 90° to the fastening groove 16 of the side panel. Here, the guide rail 24 is attached to this in such a way that the fastening groove 25 also serves as a contact surface 26 and is fastened using fastening means 25, in particular screwed, against the contact surface 26. Preferably, the guide rail 24 is mounted in front of the connecting plates 10 located on the outside, as the connecting surface 10 additionally clamps the guide rail 24 with a positive fit, as shown in FIG. 5.

To install the mast 2, the connecting plates 10, 11 on the inside 15 and outside 16 are fastened to the support elements 8 by fastening means, which are not shown for the sake of clarity, while the associated holes 27 are shown in FIG. 2, in particular screwed on, i.e. one connecting plate 10 is fastened on the outside 14 and the next connecting plate 11 on the inside 15, whereby this is continued in alternating fashion until the mast 2 is, in particular the support elements 8 are, clad with the connecting plates 10, 11. Furthermore, the connecting plate 11 is formed folded for the inside 15 and thus comprises a folding element 28, as can be seen in FIG. 4. The folding element 28 is arranged between the support elements 8 and abuts against the connecting plate 10 mounted on the outside, so that the connecting plates 10 and 11 can be screwed together via the folding elements 28. The bolting of the connecting plates 10, 11 to each other greatly increases the flexural stiffness of the side panel 13. Furthermore, the folding element 28 also ensures that the free space between the connecting plates 10, 11 is closed off. Subsequently or alternately to the assembly of the connecting plates 10, 11, the plates 12 are attached to the front panels 18, whereby one plate 12 is attached to the next plate 12, i.e. over the entire surface, on the outside 19. Preferably, the sheets 12 have recesses 29 in order to reduce the weight. In order to further increase flexural rigidity, it is advantageous to have sheets 12 also attached over the entire surface of the inside 20 of the support elements 8. This is possible due to the special design of the fastening groove 21 on the support element 8, in particular the aluminum profile 9.

Preferably, the plate 12 for the front panel 18 is rectangular, whereas the connecting plates 10, 11 are trapezoidal or similar in shape. To this end, the short side length and the opposite long side length are attached to the support elements 8, in particular to the aluminum profile 9, so that the two sides in between are provided with the folding elements 28 in order to be able to screw it to the connecting plate 10. To this end, the folding element 28 is folded in an L-shape, so that a surface is formed parallel to the connecting plate 10 mounted on the outside, enabling a screw connection.

Of course, it is also possible for the metal sheets 12 for the front panel 18 to be fastened in alternating fashion on the inside and outside, whereby here, too, the inner metal sheet 12 is preferably folded in order to be able to screw it to the outer sheet 12.

The special design of the profile 9, in particular the fastening grooves 17, 21 for the inside 15, 20, makes it possible for the connecting plates 10, 11 to be also fastened over the entire surface, i.e. a connecting plate 10 or 11 is mounted to the next connecting plate 10 or 11 on the inside 15, 20 and outside 14, 19 of the profile 9 or support element 8.

Furthermore, with the design according to the invention it is possible that the metal sheets 12 and connecting sheets 10, 11 can be adapted to the requirements of the mast 2, whereby for this purpose it is possible to adapt the mast 2 in the direction of travel or telescoping direction by means of the profiles 9 used, i.e. the mast 2 can be adapted in its width and/or length by adapting the metal sheets 12 and/or connecting sheets 10, 11 while the support elements 8, in particular profiles 9, remain the same. A defined stiffness of the mast 2 can be determined based on the driving dynamics, the load to be transported and the height of the mast 2, so that the size and shape of the plates 12 and connecting plates 10, 11 can then be adapted. Furthermore, the required torsional rigidity of the mast 2 can be ensured by the arrangement of the fastening grooves 16, 17, 21, 22, 25 on the profile 9.

It is pointed out that the invention is not limited to the embodiments shown, but may comprise further embodiments. In particular, the embodiments or individual features of the embodiments can also be combined with each other.

The invention claimed is:

1. A mast for a storage and retrieval machine, comprising:

several, preferably four support elements or supports, to which connecting plates are fastened in order to form a mast profile, wherein connecting plates are fastened in alternating fashion on the inside and outside of the support elements or supports on two opposite side panels of the mast in order to increase the flexural and torsional rigidity, for which purpose the support element comprises corresponding fastening grooves on the inside and outside of the support elements or supports.

2. The mast according to claim 1, wherein on the further two front panels of the mast, metal sheets are fastened over the entire surface on the outside and preferably on the inside of the supporting elements.

3. The mast according to claim 1, wherein the fastening grooves for the side panel and the front panel on the inside of the support element are arranged at an angle of 90° to each other.

4. The mast according to claim 1, wherein one of the two connecting plates for the outside of the side panel or for the inside of the side panel is straight and the other connecting plate is folded.

5. The mast according to claim 1, wherein the straight and folded connecting plates are trapezoidal or similar in shape, whereby the short and long sides are attached to the support elements.

6. The mast according to claim 1, wherein the connecting plates are preferably fastened to each other with screws on the support elements and the connecting plates.

7. The mast according to claim 1, wherein guide rails for a vertically movable pallet truck are fastened to two support elements positioned next to each other.

8. The mast according to claim 1, wherein the support element comprises a contact surface for the guide rail, wherein a fastening groove for fastening the guide rail is arranged in the contact surface.

9. The mast according to claim 1, wherein the guide rail is fastened on the one hand by the contact surface of the support element and is on the other hand clamped positively by connecting plates.

10. The mast according to claim 1, wherein the supporting element is formed by an aluminum profile.

11. The mast according to claim 1, wherein the fastening grooves for the guide rail and the side panel on the outside of the support element are arranged at an angle of 90° to each other.

12. The mast according to claim 1, wherein the connecting plates for the side panel are fixed over the entire surface of the outside and the inside.

13. The mast according to claim 1, wherein the connecting plates for the outside between the support elements are folded and the connecting plates for the inside straight or vice versa.

14. The mast according to claim 1, wherein the supporting elements, in particular the aluminum profiles, are of the same design.

15. The mast according to claim 1, wherein the connecting plates are designed as full-surface plates.

* * * * *